United States Patent
Lee

(10) Patent No.: US 12,001,331 B2
(45) Date of Patent: *Jun. 4, 2024

(54) DATA STORAGE DEVICE, OPERATION METHOD THEREOF, AND STORAGE SYSTEM INCLUDING THE SAME

(71) Applicant: SK hynix Inc., Gyeonggi-do (KR)

(72) Inventor: Gun Wook Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/307,005

(22) Filed: Apr. 26, 2023

(65) Prior Publication Data
US 2023/0259455 A1    Aug. 17, 2023

Related U.S. Application Data

(63) Continuation of application No. 17/556,770, filed on Dec. 20, 2021, now Pat. No. 11,675,699, which is a (Continued)

(30) Foreign Application Priority Data

Jan. 7, 2019    (KR) .......................... 10-2019-0001699

(51) Int. Cl.
*G06F 12/02*    (2006.01)

(52) U.S. Cl.
CPC .. *G06F 12/0253* (2013.01); *G06F 2212/1044* (2013.01)

(58) Field of Classification Search
CPC ......... G06F 12/0253; G06F 2212/1044; G06F 2212/7207; G06F 2212/7208; G06F 12/0238; G06F 2212/7205; G06F 3/0655; G06F 3/0616; G06F 3/0673; G06F 3/0658; Y02D 10/00

See application file for complete search history.

(56) References Cited

U.S. PATENT DOCUMENTS 6,424,347 B1    7/2002  Kwon
11,204,865 B2 * 12/2021 Lee ...................... G06F 12/0238
(Continued)

FOREIGN PATENT DOCUMENTS

CN    101689140 A    3/2010
CN    102135942 A    7/2011
(Continued)

OTHER PUBLICATIONS

Rodriguez-Gianolli et al., Data Sharing in the Hyperion Peer Database System, VLDB '05: Proceedings of the 31st International Conference on Very large data bases, Aug. 30, 2005, pp. 1291-1294, Trondheim, Norway.

*Primary Examiner* — Zhuo H Li
(74) *Attorney, Agent, or Firm* — IP & T GROUP LLP

(57) ABSTRACT

A data storage device may include a storage including a plurality of memory blocks composed of system memory blocks for storing system data and user memory blocks for storing user data; and a controller configured to: control exchange of the system and user data with the storage in response to a request of a host device; and determine whether a start condition for performing a garbage collection operation on the storage is satisfied, based on a number of bad memory blocks in the plurality of memory blocks.

20 Claims, 7 Drawing Sheets

Related U.S. Application Data continuation of application No. 16/566,085, filed on Sep. 10, 2019, now Pat. No. 11,204,865.

(56) References Cited

U.S. PATENT DOCUMENTS

| 11,675,699 B2* | 6/2023 | Lee .................. G06F 12/0238 |
| | | 711/154 |
| 2018/0018091 A1* | 1/2018 | Shin .................. G06F 12/0246 |
| 2021/0191655 A1* | 6/2021 | Song .................. G06F 3/0659 |
| 2022/0197534 A1* | 6/2022 | Ock .................. G06F 3/064 |

FOREIGN PATENT DOCUMENTS

| CN | 103488578 A | 1/2014 |
| CN | 103688247 A | 3/2014 |
| CN | 107632777 A | 1/2018 |
| KR | 20150028610 A | 3/2015 |
| KR | 20180023267 A | 3/2018 |
| WO | 2005064475 A1 | 7/2005 |

* cited by examiner

DATA STORAGE DEVICE, OPERATION METHOD THEREOF, AND STORAGE SYSTEM INCLUDING THE SAME

CROSS-REFERENCE TO RELATED APPLICATION

This application is a continuation of U.S. patent application Ser. No. 17/556,770 filed on Dec. 20, 2021, which is a continuation of U.S. patent application Ser. No. 16/566,085 filed on Sep. 10, 2019 and issued as U.S. Pat. No. 11,204,865 on Dec. 21, 2021, which claims benefits of priority of Korean Patent Application No. 10-2019-0001699 filed on Jan. 7, 2019. The disclosure of each of the foregoing application is incorporated herein by reference in its entirety.

BACKGROUND

1. Technical Field

Various embodiments generally relate to a semiconductor apparatus, and more particularly, to a data storage device, an operation method thereof, and a storage system including the same.

2. Related Art

A storage device is electrically connected to a host device and performs a data input/output operation at a request of the host device. The storage device may use various storage media to store data.

The storage device may store data in a magnetic disk, such as a hard disk drive (HDD), or store data in a semiconductor memory apparatus, particularly, a nonvolatile memory, such as a solid state drive (SSD) or a memory card.

A storage medium using a flash memory has advantages such as large capacity, nonvolatility, low unit cost, low power consumption, and high data processing speed, as compared with a magnetic-disk-based storage medium.

In the case of a storage device, such as a flash memory, overwriting or in-place update is not possible and the life of the device is limited. Moreover, since such a storage device ages use or frequency of use increases, a method capable of extending the life of the storage medium has been continuously pursued.

SUMMARY

In an embodiment, a data storage device may include: a storage including a plurality of memory blocks composed of system memory blocks for storing system data and user memory blocks for storing user data; and a controller configured to: control exchange of the system and user data with the storage in response to a request of a host device; and determine whether a start condition for performing a garbage collection operation on the storage is satisfied, based on a number of bad memory blocks in the plurality of memory blocks.

In an embodiment, a data storage device may include: a storage including a plurality of memory blocks composed of system memory blocks for storing system data, user memory blocks for storing user data, and a reserved area including a plurality of first free memory blocks; and a controller configured to control exchange of the system and user data with the storage in response to a request of a host device, wherein a number of free memory blocks within the reserved area is changed according to the number of bad blocks among the user memory blocks, and wherein the controller is configured to determine whether a start condition for performing a garbage collection operation on the storage is satisfied, based on the number of free memory blocks within the reserved area.

In an embodiment, an operation method of a data storage device, which includes a storage including a plurality of memory blocks composed of system memory blocks for storing system data and user memory blocks for storing user data and a controller that controls exchange of the system and user data with the storage in response to a request of a host device, the operation method comprising: determining, by the controller, whether a start condition for performing a garbage collection operation on the storage is satisfied, based on a number of bad memory blocks in the plurality of memory blocks.

In an embodiment, an memory system may include: a memory device including plural reserved blocks and plural data blocks; and a controller configured to: control the memory device to replace a bad block among the data blocks with one of the reserved blocks; and control the memory device to perform a garbage collection operation on the data blocks when a number of free blocks, among the data blocks, becomes less than a first threshold and a number of the remaining reserved blocks is greater than a second threshold.

In an embodiment, an operation method of a controller for controlling a memory device including plural reserved blocks and plural data blocks, the operating method comprising: controlling the memory device to replace a bad block among the data blocks with one of the reserved blocks; and controlling the memory device to perform a garbage collection operation on the data blocks when a number of free blocks, among the data blocks, becomes less than a first threshold and a number of the remaining reserved blocks is greater than a second threshold.

DETAILED DESCRIPTION

A data storage device, an operation method thereof, and a storage system including the same are described in more detail below with reference to the accompanying drawings through various embodiments. It is noted that, throughout the specification, reference to "an embodiment" or the like is not necessarily to only one embodiment, and different references to any such phrase are not necessarily to the same embodiment(s).

As used herein, singular forms may include the plural forms as well and vice versa, unless the context clearly indicates otherwise. The articles 'a' and 'an' as used in this application and the appended claims should generally be construed to mean 'one or more' unless specified otherwise or clear from context to be directed to a singular form.

Figure 1:
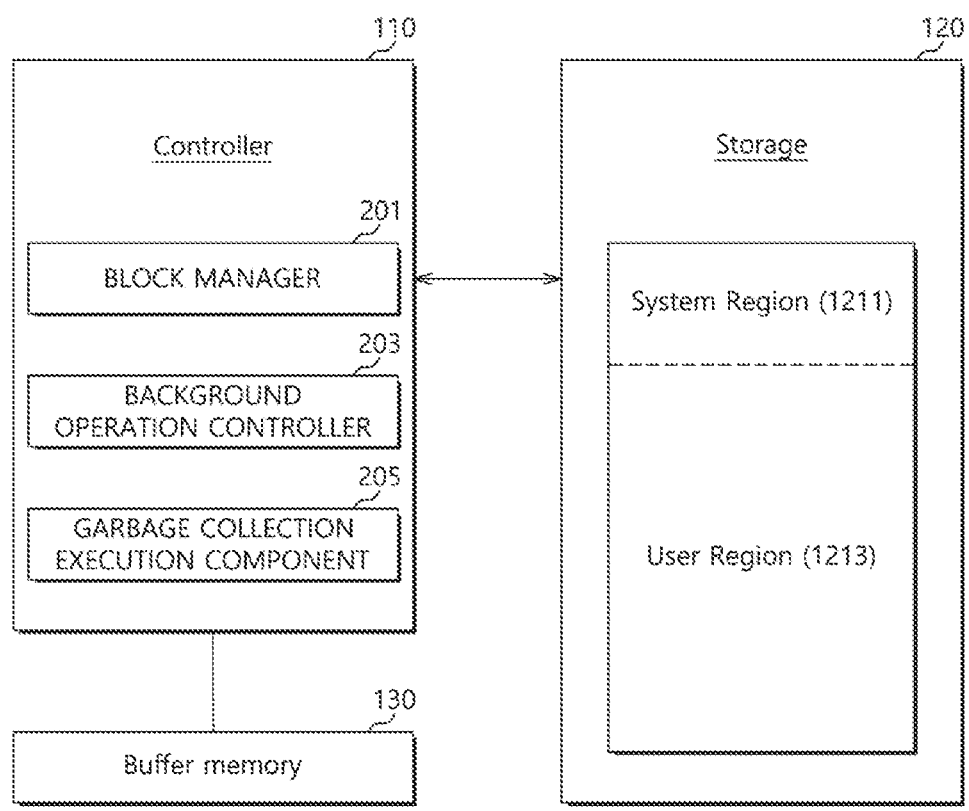
FIG. 1 is a diagram illustrating a configuration of a data storage device in accordance with an embodiment.

FIG. 1 is a diagram illustrating a configuration of a data storage device in accordance with an embodiment.

Referring to FIG. 1, a data storage device 10 may include a controller 110, a storage 120, and a buffer memory 130.

The controller 110 may control the storage 120 in response to a request of a host device. For example, the controller 110 may allow data to be programmed in the storage 120 at a program (write) request of the host device. Furthermore, the controller 110 may provide the host device with the data written in the storage 120 in response to a read request of the host device.

In an embodiment, the controller 110 may include a block manager 201, a background operation controller 203, and a garbage collection execution component 205.

The block manager 201 may manage the states of a plurality of memory blocks constituting the storage 120.

The background operation controller 203 may be configured to control a background operation which is a maintenance operation of the storage 120 and is performed in a period free from latency required by the host device. In another aspect, the background operation may be an internal operation of the data storage device 10 and may be performed at times when no write or read request is received from the host device.

The garbage collection execution component 205 may process a series of operations for ensuring a free block by moving data stored in one (a victim) memory block to another (a target) memory block. The victim memory block may become a free block through the operations.

In an embodiment, whether to perform the background operation may be determined by the background operation controller 203 of the controller 110. The background operation controller 203 may determine whether to perform a background garbage collection operation on the basis of a condition, which may be preset.

When the background garbage collection operation is triggered by the background operation controller 203, the garbage collection execution component 205 may perform at least one cycle of garbage collection execution operation to obtain one or more free blocks to satisfy the condition. When the free block(s) is/are obtained by the garbage collection execution component 205 to satisfy the condition, the background operation controller 203 may end the background garbage collection operation.

The storage 120 may write data or output written data under the control of the controller 110. The storage 120 may include a volatile or nonvolatile memory apparatus. In an embodiment, the storage 120 may be implemented using any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and/or a spin torque transfer magnetic RAM (STT-MRAM). The storage 120 may include a plurality of dies (Die 0 to Die n), a plurality of chips, or a plurality of packages. In addition, the storage 120 may be configured with single-level cells, each of which stores one-bit data or with multi-level cells, each of which stores multi-bit data.

The buffer memory 130 may serve as a region capable of temporarily storing data when the data storage device 10 performs a series of operations such as writing or reading data in cooperation with the host device. Although FIG. 1 illustrates an example in which the buffer memory 130 is located externally to the controller 110, the buffer memory 130 may be provided within the controller 110.

In an embodiment, the storage 120 may have a hierarchical structure of one or more dies, each having one or more planes, each having one or more blocks, each having one or more pages.

The storage 120 may include a system region 1211, which may be invisible to or inaccessible by a user or the host device, and a user region 1213, which may be visible to or accessible by a user or the host device. Each of the system region 1211 and the user region 1213 may include a plurality of blocks, and for example, may be configured as illustrated in FIG. 2.

Figure 2:
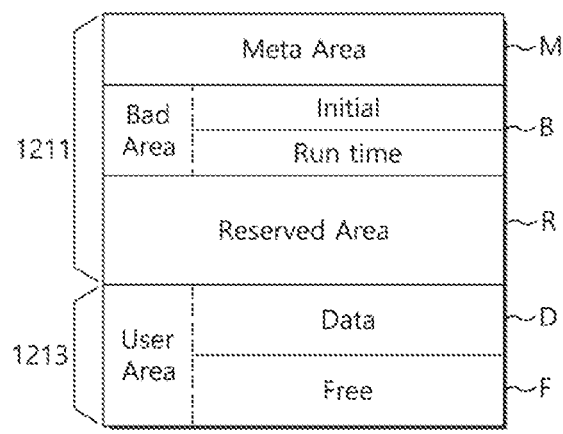
FIG. 2 is a diagram illustrating a configuration of a storage in accordance with an embodiment.

FIG. 2 is a diagram illustrating a configuration of the storage 120 in accordance with an embodiment.

Referring to FIG. 2, the system region 1211 of the storage 120 may include a meta area M, a bad area B, and a reserved area R. The user region 1213 may include a data area D and a free area F.

The meta area M may be for storing meta data for managing the data storage device 10. For example, the meta data may include file system data, block allocation information, block meta information including block-specific attributes/the number of valid pages/a page offset/the number of times of access (program or erase) and the like, mapping information between logical addresses of the host device and physical addresses of the storage 120, and the like.

The bad area B may be a set of unusable blocks. The bad area B may include an initial bad block classified as a bad block in a manufacturing process and a run time bad block classified as a bad block during the use of the data storage device 10. A memory block satisfying a bad block condition during the operation of the data storage device 10 may be classified as the run time bad block. In an embodiment, the number of program/erase cycles, the number of erase failures and the like may be used to define the bad block condition; however, the present invention is not limited thereto.

The reserved area R may include a memory block that is reserved for a maintenance operation of the data storage device 10. In an embodiment, the maintenance operation may include any or all of a trim (TRIM) operation, a garbage collection operation, a bad block replacement operation and the like. Accordingly, although the reserved memory block included in the reserved area R has been initially allocated to the system region 1211, the reserved memory block may be incorporated into the user region 1213 by the maintenance operation. The reserved area R may also be referred to as an overprovisioning area. When a part of the storage 120 is allocated to the reserved area R, the maintenance operation is smoothly performed, so that it is possible to substantially maintain the performance of the data storage device 10 and extend the life thereof. To this end, the reserved memory block constituting the reserved area R may be composed of only a free block.

The data area D may include a plurality of memory blocks, in which data inputted from the host device is stored, and may be allocated to the user region 1213. Within the user area 1213, a memory block storing data may be regarded as in the data area D while an erased memory block storing no valid data may be regarded as in the free area F. Through the garbage collection operation, a memory block may be selected as a victim block within the data area D and valid data stored in the victim block may be moved into an erased block selected as a target block within the free area F. Then, the victim block may be erased to become a free block. Now, the target block may become a memory block of the data area D and the victim block may become a free block of the free area F.

The free area F may include an empty memory block, in which no valid data is stored, and may be allocated to the user region 1213.

The allocation, release, change and the like of each block constituting the storage 120 may be performed by the block manager 201 of the controller 110.

Figure 3:
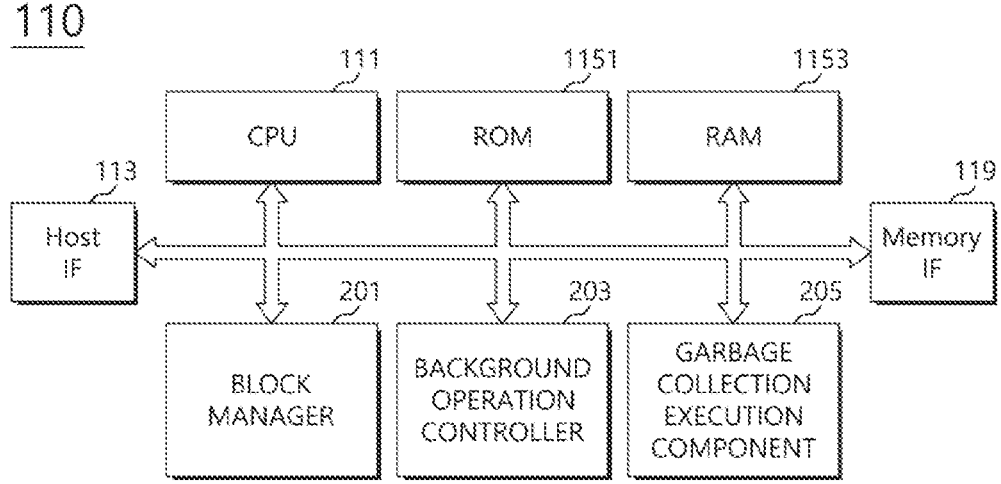
FIG. 3 is a diagram illustrating a configuration of a controller in accordance with an embodiment.

FIG. 3 is a diagram illustrating a configuration of the controller in accordance with an embodiment.

Referring to FIG. 3, the controller 110 may include a central processing unit (CPU) 111, a host interface (IF) 113, a ROM 1151, a RAM 1153, a memory interface (IF) 119, the block manager 201, the background operation controller 203, and the garbage collection execution component 205.

The CPU 111 may be configured to transfer various types of control information for a data read or write operation for the storage 120 to the host IF 113, the RAM 1153, and the memory IF 119. In an embodiment, the CPU 111 may operate according to firmware provided for various operations of the data storage device 10. In an embodiment, the CPU 111 may perform a function of a flash translation layer (FTL) for performing address mapping, wear leveling and the like for managing the storage 120, a function of detecting and correcting an error of data read from the storage 120, and the like.

The host IF 113 may provide a communication channel for receiving a command and a clock signal from the host device and controlling data input/output under the control of the central processing unit 111. Particularly, the host IF 113 may provide a physical connection between the host device and the data storage device 10. The host IF 113 may provide interfacing with the data storage device 10 in correspondence to a bus format of the host device. The bus format of the host device may include at least one of standard interface protocols, such as a secure digital, a universal serial bus (USB), a multi-media card (MMC), an embedded MMC (eMMC), a personal computer memory card international association (PCMCIA), a parallel advanced technology attachment (PATA), a serial advanced technology attachment (SATA), a small computer system interface (SCSI), a serial attached SCSI (SAS), a peripheral component interconnection (PCI), a PCI express (PCI-E), and/or a universal flash storage (UFS).

The ROM 1151 may store program codes for the operation of the controller 110, for example, firmware or software, and store code data and the like used by the program codes.

The RAM 1153 may store data required for the operation of the controller 110 or data generated by the controller 110.

The memory IF 119 may provide a communication channel for signal transmission/reception between the controller 110 and the storage 120. The memory IF 119 may write data, which has been temporarily stored in the buffer memory 130, in the storage 120 under the control of the central processing unit 111. Furthermore, the memory IF 119 may transfer data read from the storage 120 to the buffer memory 130 for temporary storage.

The block manager 201 may manage the states of a plurality of memory blocks constituting the storage 120. In an embodiment, the block manager 201 may be configured to store the block allocation information, the block meta information including an attribute/the number of valid pages/a page offset/the number of times of access (program or erase) and the like of a memory block, the mapping information between logical addresses and physical addresses, and the like in the meta area M of the storage 120, and to update or delete the stored information.

The "attribute" of the block may be information indicating the state of the block, for example, whether the block is an open block, a closed block, a free block, or a bad block.

The open block may refer to a memory block currently in use in order to process a write request. The closed block may be a block having no empty region capable of storing data or a block set not to store data. The free block may refer to an empty block in which data may be written. The bad block may be an unusable block.

The "number of valid pages" may be information indicating the number of valid pages included in each block.

The "page offset" may indicate offset information of a page to be subsequently written in a corresponding block.

The background operation controller 203 may control the start and end of the background operation.

The background operation may be the maintenance operation of the storage 120 performed in a period free from a latency required by the host device.

The background operation may include a garbage collection operation of moving data stored in a memory block among the memory blocks in the storage 120 to another memory block, a wear leveling operation of swapping data between memory blocks in the storage 120, a map flush operation of storing map data stored in the controller 110 in the meta area M of the storage 120, a bad block management operation of detecting and processing a bad block, or the like.

When a background operation condition is satisfied, the background operation controller 203 may control the background operation to start in a period in which the background operation can be performed. Such period includes when the data storage device 10 enters a power-down mode, and when the data storage device 10 is in an idle state; however, the present invention is not limited thereto.

In an embodiment, the background operation controller 203 may trigger the background garbage collection operation. On the basis of a dirty level of the storage 120, where the dirty level represents a number of closed blocks in the free area F in the user region 1213 of the storage 120, the background operation controller 203 may primarily determine whether to trigger the background garbage collection operation.

As the storage 120 ages, the number of bad blocks inevitably increases. As bad blocks are detected they are replaced with reserved blocks allocated to the reserved area R by the bad block management operation, and thus the number of reserved blocks in the reserved area R of the system region 1211 gradually decreases. In such a situation, when the background garbage collection operation is triggered based on only the number of free blocks of the user region 1213, a target number of free blocks may not be ensured even though the garbage collection is performed. This is because the number of reserved blocks in the reserved area R can be smaller than target number of free blocks. Therefore, as the garbage collection is repeated many times, the storage 120 may wear out.

In this regard, the background operation controller 203 may primarily determine whether to trigger the background garbage collection operation on the basis of the dirty level of the storage 120, and may secondarily determine whether to trigger the background garbage collection operation based on the number of remaining reserved blocks of the reserved area R.

Accordingly, when the dirty level of the storage 120 exceeds a first level TH1 and the number of reserved blocks is equal to or more than a second level TH2, the background operation controller 203 may allow the background garbage collection operation to be triggered.

As the background garbage collection operation is triggered, the garbage collection execution component 205 may perform at least once of garbage collection cycle, which ensures a free block by moving data stored in a memory block (a source block or victim block) to another memory block (a target block).

The background operation controller 203 may selectively terminate the background garbage collection operation on the basis of the processing result of the garbage collection execution component 205. In an embodiment, when the dirty level of the storage 120 is smaller than a third level TH3 after the garbage collection operation of the garbage collection execution component 205, the background operation controller 203 may end the background garbage collection operation.

As described above, when the number of free blocks allocated to the user region 1213 in the storage 120 is smaller than a preset threshold value, the controller 110 in accordance with an embodiment may control the background garbage collection operation to start in consideration of the number of reserved blocks.

In another aspect, when the number of free blocks allocated to the user region 1213 in the storage 120 is smaller than the preset threshold value, the controller 110 may control the background garbage collection operation to start in consideration of the number of remaining reserved blocks within the reserved area R, the capacity of which is changed according to the bad blocks.

Furthermore, the controller 110 may control the background garbage collection operation to end on the basis of the number of free blocks ensured as a result of performing the background garbage collection operation.

Figure 4:
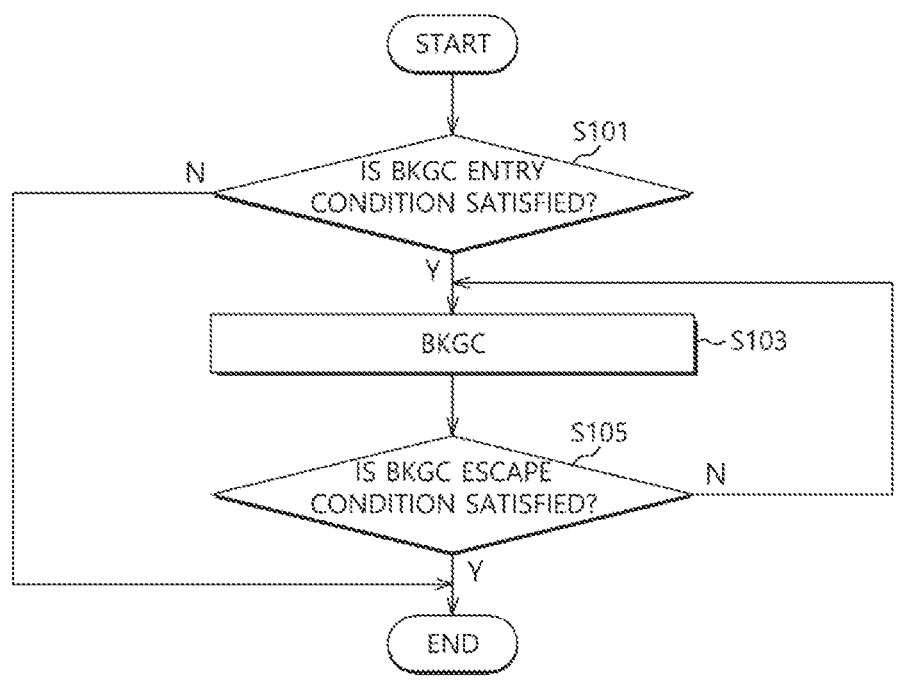
FIG. 4 to FIG. 6 are flowcharts for explaining an operation method of the data storage device in accordance with an embodiment.
Figure 5:
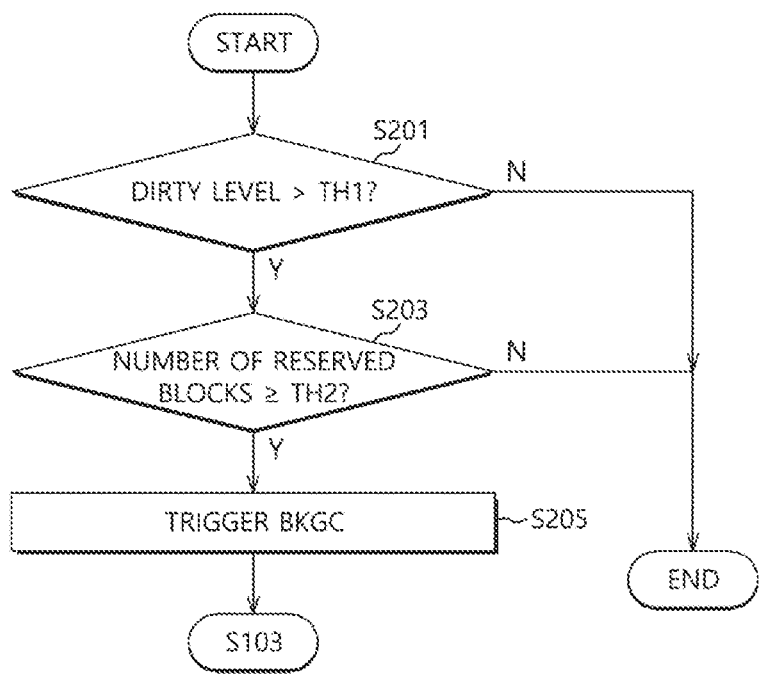
Figure 6:
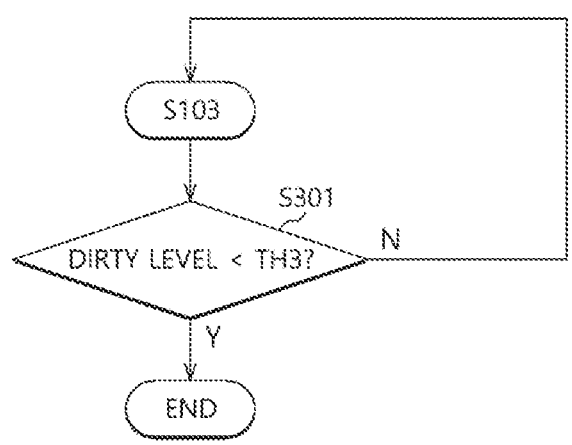

FIG. 4 to FIG. 6 are flowcharts for explaining an operation method of the data storage device in accordance with an embodiment.

Referring to FIG. 4, the background operation controller 203 of the controller 110 may determine whether to trigger the background garbage collection operation BKGC on the basis of the states of the memory blocks in the storage 120, which are generated and managed by the block manager 201 (S101).

In an embodiment, as illustrated in FIG. 5, the background operation controller 203 may primarily determine whether to trigger the background garbage collection operation on the basis of the dirty level representing the number of free blocks in the user region 1213 of the storage 120. In the primary determination process, for example, the background operation controller 203 may determine whether the dirty level of the storage 120 exceeds the first level TH1 (S201).

In addition, when the dirty level of the storage 120 exceeds the first level TH1, the background operation controller 203 may secondarily determine whether to trigger the background garbage collection operation in consideration of the degree of generation of bad blocks in the storage 120. For example, the background operation controller 203 may confirm whether the number of reserved blocks remaining after replacing bad blocks with the reserved blocks of the reserved area R of the system region 1211 is equal to or more than the second level TH2 (S203).

When the number of reserved blocks is equal to or more than the second level TH2, the background operation controller 203 may trigger the background garbage collection operation (S205).

Referring back to FIG. 4, as the background garbage collection operation is triggered by the background operation controller 203, the garbage collection execution component 205 may perform the background garbage collection operation BKGC (S103).

As the cycle of the background garbage collection operation BKGC progresses, the background operation controller 203 may determine whether to terminate the background garbage collection operation based on whether a termination, end or escape condition is satisfied (S105).

For example, as illustrated in FIG. 6, the background operation controller 203 may confirm whether the dirty level of the storage 120 is smaller than the third level TH3 after the garbage collection cycle of the garbage collection execution component 205 is performed (S301), and end the background garbage collection operation when the dirty level is restored (S301: N). When the dirty level is not restored (S301: Y), the garbage collection cycle may be performed again. That is, the background operation controller 203 may end the garbage collection operation according to a number of free memory blocks generated within the user area 1213 as a result of the garbage collection operation.

As described above, when a free block to be incorporated into the user region 1213 is ensured in the system region 1211, the background garbage collection operation is performed, so that it is possible to ensure a free block for storing user data as a result of performing the garbage collection operation and end the background garbage collection operation.

Figure 7:
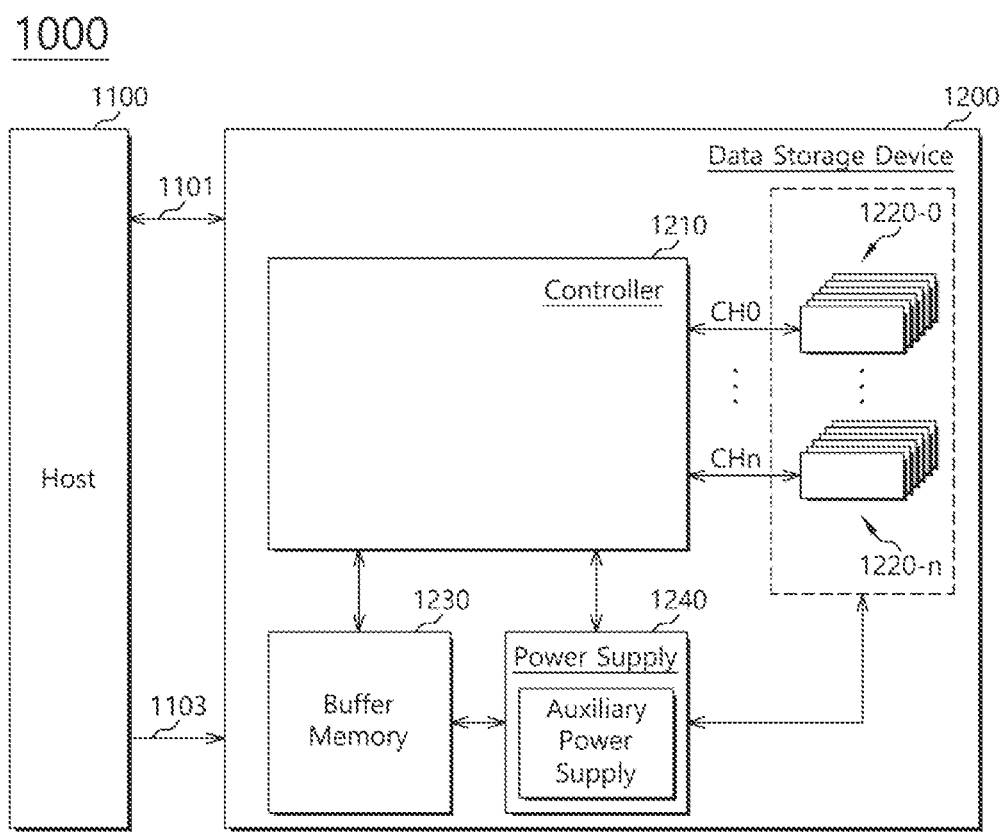
FIG. 7 is a diagram illustrating a data storage system in accordance with an embodiment.

FIG. 7 is a diagram illustrating a data storage system 1000, in accordance with an embodiment.

Referring to FIG. 7, the data storage 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-*n*, a buffer memory device 1230, a power supply 1240, a signal connector 1101, and a power connector 1103.

The controller 1210 may control general operations of the data storage device 1200. The controller 1210 may include a host interface, a control component, a random access memory used as a working memory, an error correction code (ECC) unit, and a memory interface. In an embodiment, the controller 1210 may configured as controller 110 shown in FIGS. 1 and 2.

The host device 1100 may exchange a signal with the data storage device 1200 through the signal connector 1101. The signal may include a command, an address, data, and the like.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-*n*. Further, the buffer memory device 1230 may temporarily store the data read from at least one of the nonvolatile memory devices 1220-0 to 1220-*n*. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices coupled to each channel may be coupled to the same signal bus and data bus.

The power supply 1240 may provide power inputted through the power connector 1103 to the controller 1210, the nonvolatile memory devices 1220-0 to 1220-n and the buffer memory device 1230 of the data storage device 1200. The power supply 1240 may include an auxiliary power supply. The auxiliary power supply may supply power to allow the data storage device 1200 to be properly terminated when a sudden power interruption occurs. The auxiliary power supply may include bulk-capacity capacitors sufficient to store the needed charge.

The signal connector 1101 may be configured as any of various types of connectors depending on an interface scheme between the host device 1100 and the data storage device 1200.

The power connector 1103 may be configured as any of various types of connectors depending on a power supply scheme of the host device 1100.

Figure 8:
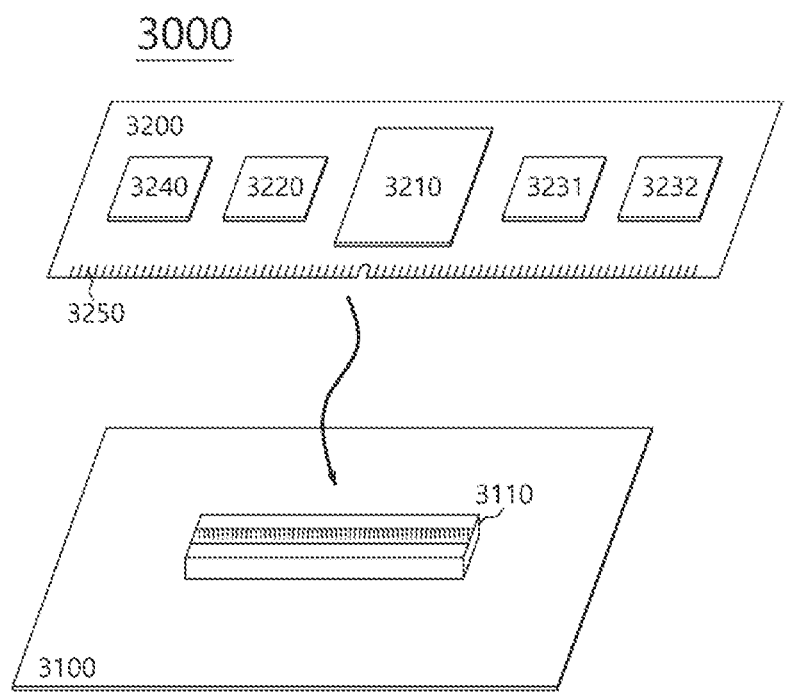
FIG. 8 and FIG. 9 are diagrams illustrating a data processing system in accordance with an embodiment.

FIG. 8 is a diagram illustrating a data processing system 3000, in accordance with an embodiment. Referring to FIG. 8, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 shown in FIGS. 1 and 2.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and so forth, and power may be transferred between the host device 3100 and the memory system 3200. The connection terminal 3250 may be configured as any of various types depending on an interface scheme between the host device 3100 and the memory system 3200. The connection terminal 3250 may be disposed on a side of the memory system 3200, as shown.

Figure 9:
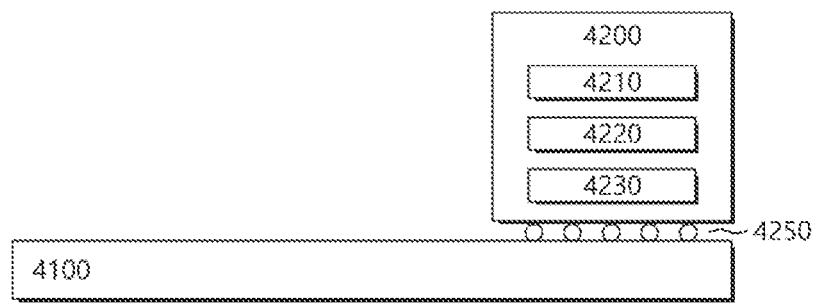

FIG. 9 is a diagram illustrating a data processing system 4000 in accordance with an embodiment. Referring to FIG. 9, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1 and 2.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 10:
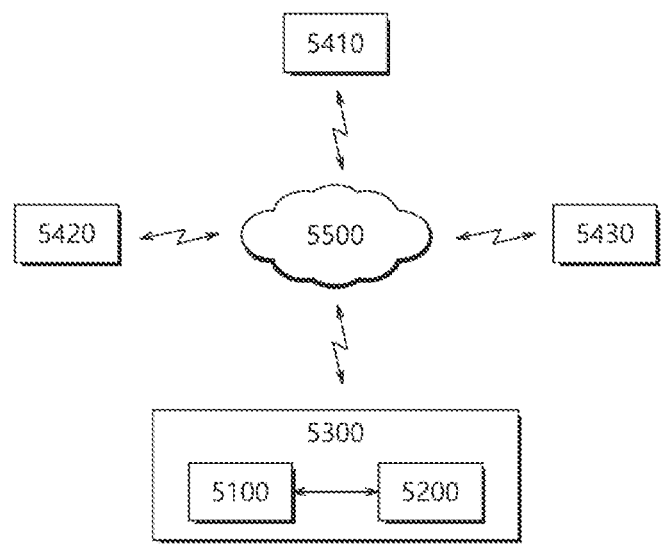
FIG. 10 is a diagram illustrating a network system including a data storage device in accordance with an embodiment.

FIG. 10 is a diagram illustrating a network system 5000 including a data storage device, in accordance with an embodiment. Referring to FIG. 10, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the memory system 10 shown in FIG. 1, the data storage device 1200 shown in FIG. 7, the memory system 3200 shown in FIG. 8, or the memory system 4200 shown in FIG. 9.

Figure 11:
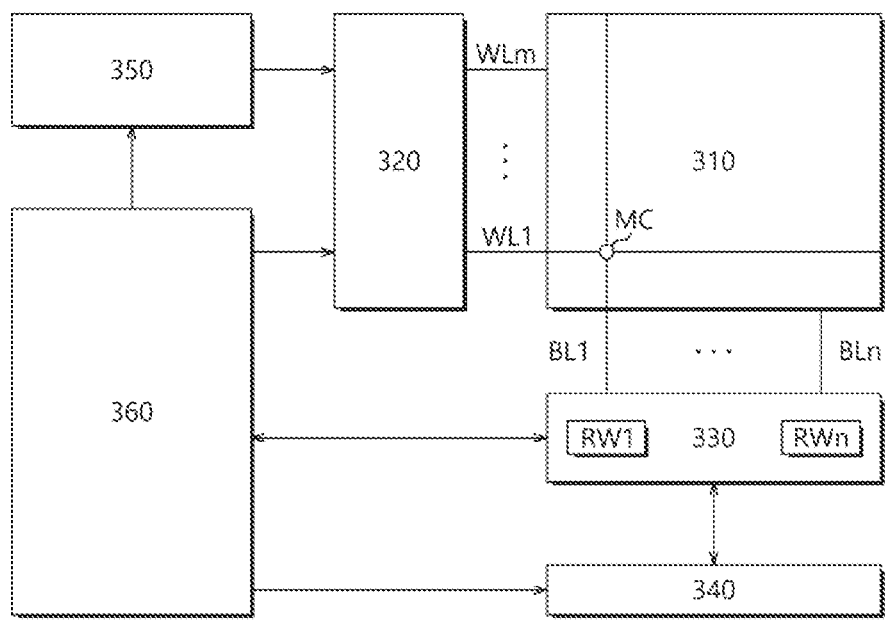
FIG. 11 is a block diagram illustrating a nonvolatile memory device included in a data storage device in accordance with an embodiment.

FIG. 11 is a block diagram illustrating a nonvolatile memory device 300 included in a data storage device, such as the data storage device 10, in accordance with an embodiment. Referring to FIG. 11, the nonvolatile memory device 300 may include a memory cell array 310, a row decoder 320, a data read/write block 330, a column decoder 340, a voltage generator 350, and control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure extending substantially perpendicular direction to the flat surface of a semiconductor substrate. Moreover, the three-dimensional memory array means a structure including NAND strings which memory cells comprised in NAND strings are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality. In an embodiment, in the NAND strings of the three-dimensional memory array memory cells are arranged in the horizontal and vertical directions with respect to the surface of the semiconductor substrate. The memory cells may be variously spaced to provide different degrees of integration.

The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate according to control of the control logic 360. The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations of the nonvolatile memory device 300.

While various embodiments have been described above, it will be understood to those skilled in the art that the embodiments described are examples only. Accordingly, the present invention should not be limited based on the described embodiments. Rather, the present invention encompasses not only the described embodiments but all modifications and variations thereof that fall within the scope of the claims.

What is claimed is:

1. A data storage device comprising:
   a storage area including an overprovisioning area, the storage area being composed of a plurality of memory blocks; and
   a controller configured to determine whether to trigger a garbage collection operation on the storage area based on a number of free blocks and a number of bad blocks among the plurality of memory blocks,
   wherein the controller is configured to replace the at least one bad memory block with at least one of the plurality of memory blocks.

2. The data storage device according to claim 1, wherein, when the number of free blocks among the plurality of memory blocks is less than a first threshold value, the controller does not trigger the garbage collection operation on the storage area in case that the number of bad blocks among the plurality of memory blocks exceeds a second threshold value.

3. The data storage device according to claim 1, wherein, when the number of free blocks among the plurality of memory blocks is less than the first threshold value, the controller triggers the garbage collection operation on the data storage in case that the number of bad blocks among the plurality of memory blocks does not exceed the second threshold value.

4. The data storage device according to claim 1, wherein, when the number of free blocks among the plurality of memory blocks is less than a first threshold value, the controller does not trigger the garbage collection operation on the storage area regardless of the number of bad blocks among the plurality of memory blocks.

5. The data storage device according to claim 3, wherein, when the number of free blocks among the plurality of memory blocks becomes greater than a third threshold value as a result of the garbage collection operation, the controller ends the garbage collection operation on the storage area.

6. The data storage device according to claim 3, wherein the controller is configured to replace the at least one bad block with at least one of the plurality of memory blocks of the overprovisioning area.

7. A data storage device comprising:
   a storage including a plurality of memory blocks; and
   a controller configured to determine whether to trigger a garbage collection operation on the storage based on a number of free blocks and a number of bad blocks among the plurality of memory blocks,
   wherein, when the number of free blocks among the plurality of memory blocks is less than a first threshold value, the controller determines whether to trigger the garbage collection operation on the storage based on whether the number of bad blocks exceeds a second threshold value.

8. The data storage device according to claim 7, wherein, when the number of free blocks among the plurality of memory blocks is less than the first threshold value, the controller does not trigger the garbage collection operation on the storage in case that the number of bad blocks exceeds the second threshold value.

9. The data storage device according to claim 7, wherein, when the number of free blocks among the plurality of memory blocks is greater than the first threshold value, the controller does not trigger the garbage collection operation on the storage regardless the number of bad blocks.

10. The data storage device according to claim 8, wherein, when the number of free blocks among the plurality of memory blocks becomes greater than a third threshold value as a result of the garbage collection operation, the controller ends the garbage collection operation on the storage.

11. The data storage device according to claim 8, wherein the controller provides an overprovisioning area for storing user data.

12. The data storage device according to claim 11, wherein the controller is configured to replace the at least one bad block with at least one of the plurality of memory blocks in the overprovisioning area.

13. A data storage device comprising:
a storage area including a overprovisioning area, the storage area being composed of a plurality of memory blocks; and
a controller configured to determine whether to trigger a garbage collection operation on the storage area based on a number of free blocks among the plurality of memory blocks and a level of aging of the storage area,
wherein the controller is configured to replace a bad memory block caused by the aging of the storage with at least one of the plurality of memory blocks.

14. The data storage device according to claim 13, wherein the at least one of the plurality of memory blocks for replacing the bad memory block is selected from the overprovisioning area.

15. The data storage device according to claim 13, wherein, when the number of free blocks among the plurality of memory blocks is less than a first threshold value, the controller determines whether to trigger the garbage collection operation on the data storage based on the level of aging.

16. The data storage device according to claim 14, wherein a number of the bad blocks increases as the level of the aging becomes higher.

17. A data storage device comprising:
a storage area including an overprovisioning area, the storage area being composed of a plurality of memory blocks; and
a controller configured to determine whether to trigger a garbage collection operation on the storage area based on a dirty level of the storage area and a number of bad blocks among the plurality of memory blocks,
wherein the controller is configured to replace the at least one bad memory block with at least one of the plurality of memory blocks in the overprovisioning area.

18. The data storage device according to claim 17, wherein, when the dirty level of the storage area exceeds a first level and the number of the bad blocks is greater than a second threshold value, the controller allows the garbage collection operation to be triggered.

19. The data storage device according to claim 18, wherein, when the dirty level of the storage area becomes smaller than a third level, the controller ends the garbage collection operation.

20. The data storage device according to claim 17, wherein the dirty level represents a number of free blocks in the storage area.

* * * * *